United States Patent [19]

Brock et al.

[11] 4,192,003
[45] Mar. 4, 1980

[54] SIGNAL RECOVERY METHOD AND APPARATUS

[75] Inventors: George W. Brock; Edward J. Pawlowski, both of Boulder; Ricardo R. Stone, Eldorado Springs, all of Colo.

[73] Assignee: International Business Machines Corporation, Armonk, N.Y.

[21] Appl. No.: 896,117

[22] Filed: Apr. 13, 1978

[51] Int. Cl.² ............................................. G06F 15/20
[52] U.S. Cl. ........................................ 364/487; 307/264; 328/114; 328/165; 364/574; 364/852
[58] Field of Search ............... 364/483, 487, 572, 573, 364/574, 577, 852, 854; 328/161, 162, 164, 165, 114, 151; 307/264

[56] References Cited

U.S. PATENT DOCUMENTS

| | | | |
|---|---|---|---|
| 2,748,278 | 5/1956 | Smith | 364/852 |
| 3,120,605 | 2/1964 | Nathan et al. | 364/854 |
| 3,432,651 | 3/1969 | Peras | 364/852 |
| 3,668,532 | 6/1972 | Potash | 328/151 |
| 3,758,763 | 9/1973 | Nohara et al. | 364/487 |
| 3,851,266 | 11/1974 | Conway | 328/164 |
| 3,859,602 | 1/1975 | Janssen et al. | 328/162 |
| 3,895,237 | 7/1975 | Harr | 328/150 |
| 4,065,665 | 12/1977 | Rietsch | 364/487 |

*Primary Examiner*—Errol A. Krass
*Attorney, Agent, or Firm*—Herbert F. Somermeyer

[57] ABSTRACT

Signal peaks are identified by measuring the slopes on each side of a signal peak. Each slope measurement is linearized to ascertain a slope angle. Both linearized portions and slope angles are compared to find an intersection of the linearized portions. Such intersection identifies the location of a single peak. The measurement method is particularly useful for detection of peaks in signals with low signal to noise ratios. A programmed digital computer may be used in the measurement method.

12 Claims, 6 Drawing Figures

FIG. 3
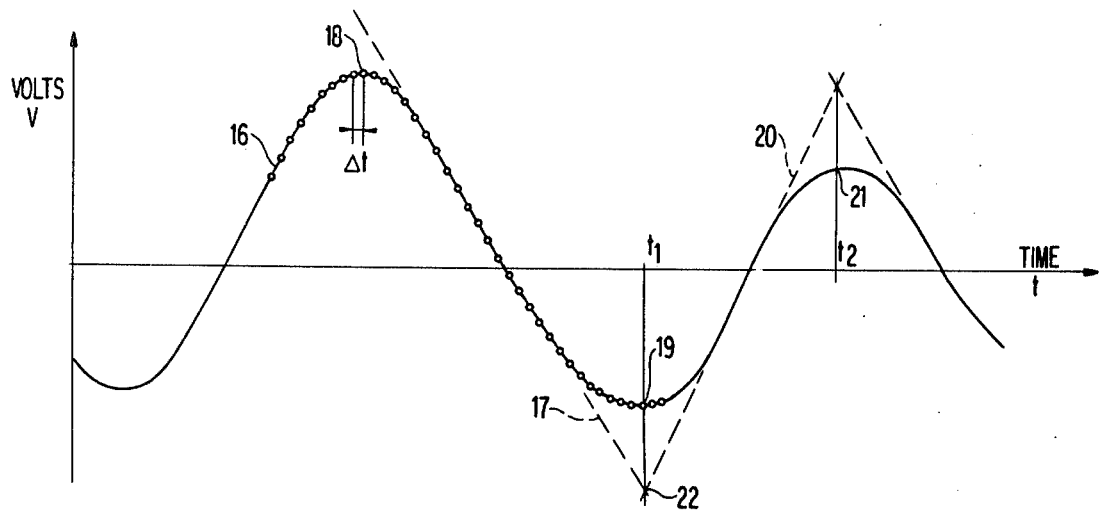
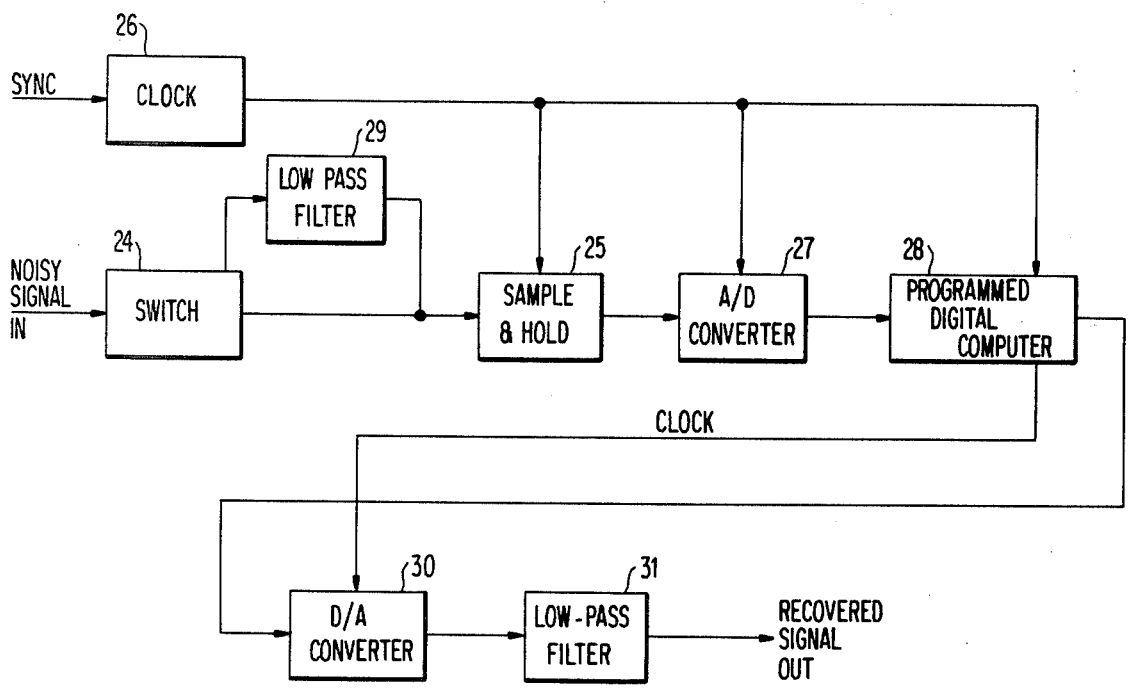
FIG. 4

SIGNAL RECOVERY METHOD AND APPARATUS

BACKGROUND OF THE INVENTION

1. Field of the Invention

The present invention generally relates to the field of signal recovery, and, more particularly, to a method and apparatus using a programmed digital computer to compute the locations in time of the peaks of a generally sinusoidal signal waveform in especially high noise-to-signal ratio environments. The invention is especially useful in determining phase shift for a head-to-magnetic recording medium interface or in data reconstruction of low amplitude signals.

2. Description of the Prior Art

In the application of detecting a phase shift in a noisy signal, the conventional approach has been to differentiate the input noisy signal and detect the zero crossings of the differentiated signal. This technique is generally illustrated in FIG. 1 of the drawings, wherein the input noisy signal is represented by curve 10, whereas the signal represented by curve 11 is obtained by differentiating the input noisy signal. It will be observed that the zero crossings of the curve 11 occur at each of the maximums of the input signal. This conventional technique works well where the noise-to-signal ratio is relatively low. However, in environments where the noise may be as high as 30-50%, the result of differentiating the noisy signal is to produce a signal that has many spurious zero crossings. This is illustrated in FIG. 2, wherein the input noisy signal is represented by curve 13, and curve 14 represents the differentiated signal. Because of the many zero crossings of the differentiated signal, it becomes impossible to correctly identify the peaks of the noisy signal.

While the reconstruction of information from an input noisy signal having an especially high noise-to-signal ratio presents a slightly different problem from that of detecting phase shift, the same sort of information useful in detecting phase shift can also be used to reconstruct the information signal. In other words, if the locations of the peaks of the input noisy signal can be determined with reasonable accuracy, it is then possible to reconstruct from this data the original information signal.

SUMMARY OF THE INVENTION

Therefore, the broad object of this invention is to provide an improved method and apparatus for accurately locating the signal peaks in a generally sinusoidal waveform wherein the noise-to-signal ratio is especially high.

A more specific object of the invention is to provide such a method and apparatus wherein the voltage levels at sampled points of the waveforms are compared to identify linear portions of the waveform. The intersection of respective straight lines drawn through these linear portions locates the times of occurrence of the signal peaks in the input noisy waveform.

The foregoing objects of the invention are attained by periodically sampling the input noisy signal. The signal samples are digitized and supplied to a programmed digital computer. Each digitized input to the digital computer represents the ordinate of the corresponding sampling point of the input noisy signal, the abscissa being the sampling time. As a result, the sequence of digitized inputs to the programmed digital computer represents the coordinates of a time sequence of points at which the noisy signal is sampled. The digital computer is programmed to compare the ordinates of successive points to determine whether the change in value of the ordinates is in the same direction. At such time as the change in value of the ordinates reverses in direction, the computer determines if a sufficient number of points has been accumulated to that point in time to permit a least squares straight line curve-fitting subroutine to be employed. If so, the least squares straight line curve-fitting subroutine generates an output which represents the Y intercept and the slope of the straight line through the sampled points. This process is repeated, and assuming that the slope of the next computed straight line has the opposite sign of the just-preceding computed straight line, then two simultaneous linear equations are defined by the outputs of the least squares straight line subroutine. These simultaneous linear equations can be solved to identify the abscissa of the coordinates of the signal peak. In other words, solution of the simultaneous linear equations provides an output which identifies the time of occurrence of the signal peak. Recognizing that a series of straight lines having slopes which alternate in sign describes a generally triangular waveform, it is possible then to calculate the input signal amplitude at the peak, assuming that the input signal with the noise removed is generally sinusoidal in shape. Alternatively, digital data generated by the programmed digital computer and representing a sequence of coordinates defining the triangular waveform signal can be read out to a digital-to-analog converter which then produces an analog triangular waveform signal. The resulting analog triangular waveform signal is supplied to a low-pass filter which provides at its output the recovered signal.

BRIEF DESCRIPTION OF THE DRAWINGS

FIG. 3 illustrates a generally sinusoidal waveform useful in explaining the basic technique according to the invention.

FIG. 4 is a block diagram of an apparatus for implementing the invention.

DESCRIPTION OF THE PREFERRED EMBODIMENTS

The principle of the invention will be described with reference to the generally sinusoidal waveform 16 graphically illustrated in FIG. 3. The input signal voltage is periodically sampled at points separated by fixed time interval $\Delta t$. The voltage obtained at each sampling time defines the ordinate, and the time at which the sample is taken defines the abscissa of a point on the signal waveform. Thus, the coordinates of successive points on the waveform are accumulated, and each point in succession is tested to determine if there is a monotonic increase or decrease in the voltage—i.e., a change in the sign of the slope of the waveform—such as occurs at a peak in the waveform.

When a change in the sign of the slope of the waveform is detected, a least squares fit of a straight line to the accumulated points is obtained, provided that a sufficient number of points has been accumulated. In practice, thirteen (13) points have been found to provide sufficient accuracy; however, the exact number of points selected will depend in part on the input signal waveform and the sampling time period. The result will be a straight line 17 which will closely follow the most linear portion of the input waveform between the peaks 18 and 19, for example.

Figure 1:
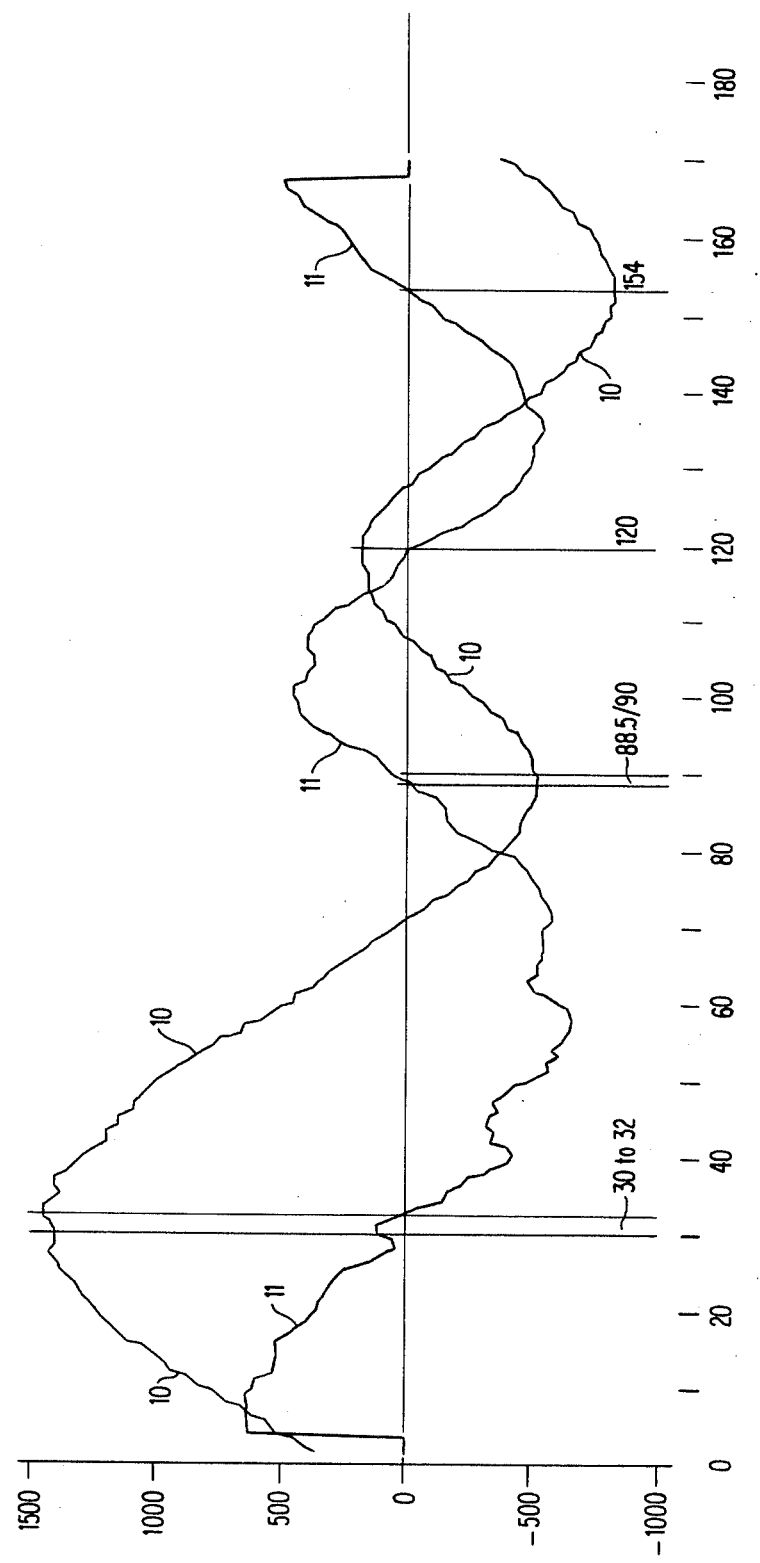
FIG. 1 is a graphical representation of a noisy signal and the differentiated signal illustrating the conventional method of detecting the location of peaks in the noisy signal.
Figure 2:
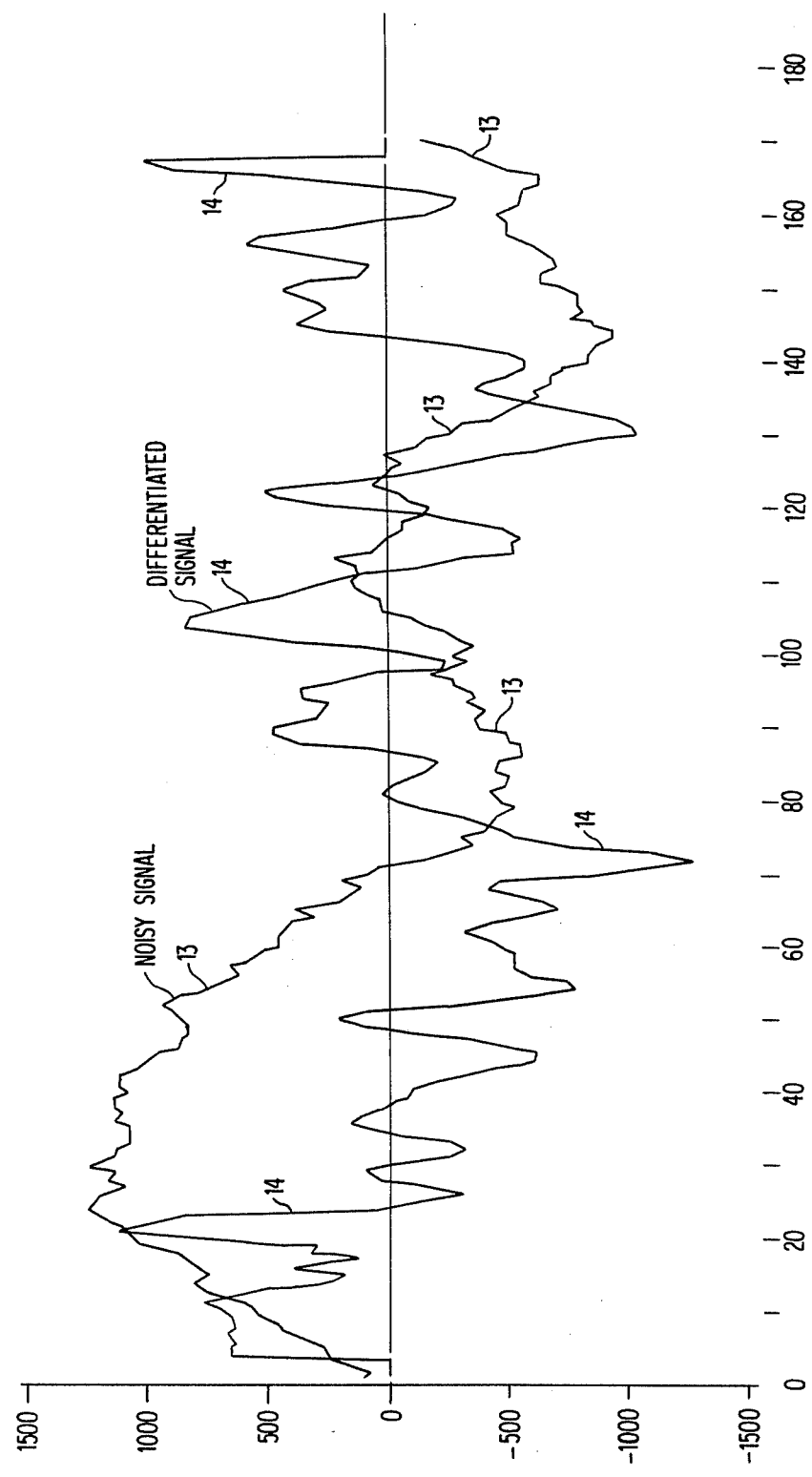
FIG. 2 is a graphical representation of a noisy signal having an especially high noise-to-signal ratio and of the differentiation of that signal to illustrate the failure of the conventional method to detect the location of the peaks in the noisy signal.

It will be understood, of course, that the waveform illustrated in FIG. 3 is a very smooth waveform having well-defined peaks. A waveform having an especially high noise-to-signal ratio, such as that illustrated in FIG. 2, will not have well-defined peaks, but instead the peaks will be more or less obliterated by the noise, thereby resulting in either no peak or many peaks. As a result, the most linear part of the signal waveform will be in the vicinity of the base line cross-over region, which is the part of the waveform that is the least affected by the noise. Moreover, this part of the signal waveform will be more consistent over a period of time than the impinging noise. Once the line 17 has been established, the same process is repeated to establish the next line 20 between the peaks 19 and 21. These two lines, for example, can be expressed as follows:

line 17: $y = m_1 x + b_1$; and line 20: $y = m_2 x + b_2$, where:
  $m_1$ and $m_2$ are the slopes of lines 17 and 20, respectively; and
  $b_1$ and $b_2$ are the Y intercepts of the lines 17 and 20, respectively.

The solution of these two simultaneous linear equations provides the coordinates of the point 22 of intersection of the two lines. The abscissa of the point 22 is the time of occurrence of the peak 19. The ordinate of the point 22, while not being equal to the amplitude of the peak 19, can be used to calculate a close approximation of the amplitude of the peak 19. More specifically, it can be shown that the amplitude of the triangular waveform defined by the successive lines, including lines 17 and 20, is approximately 1.507 times the amplitude of the sinusoidal waveform 16. The process just described to locate the abscissa of the peak 19 is repeated to locate the abscissa, or time of occurrence, of the peak 21 and successive peaks of the waveform 16.

FIG. 4 shows a block diagram of an apparatus for signal recovery based on the technique described with respect to FIG. 3. The noisy input signal is applied through a switch 24 to a sample-and-hold circuit 25. The sampling period is determined by the output of a clock 26 which is externally synchronized. For example, if the input noisy signal is derived from a magnetic recording medium, say a disk memory, then the synchronization signal to the clock can be generated by a tachometer connected to the disk spindle. The voltage samples temporarily stored in the sample-and-hold circuit 25 are then digitized by an analog-to-digital converter 27 and supplied to a programmed digital computer 28, both of which receive the clock signals generated by the clock 26.

Figure 5:
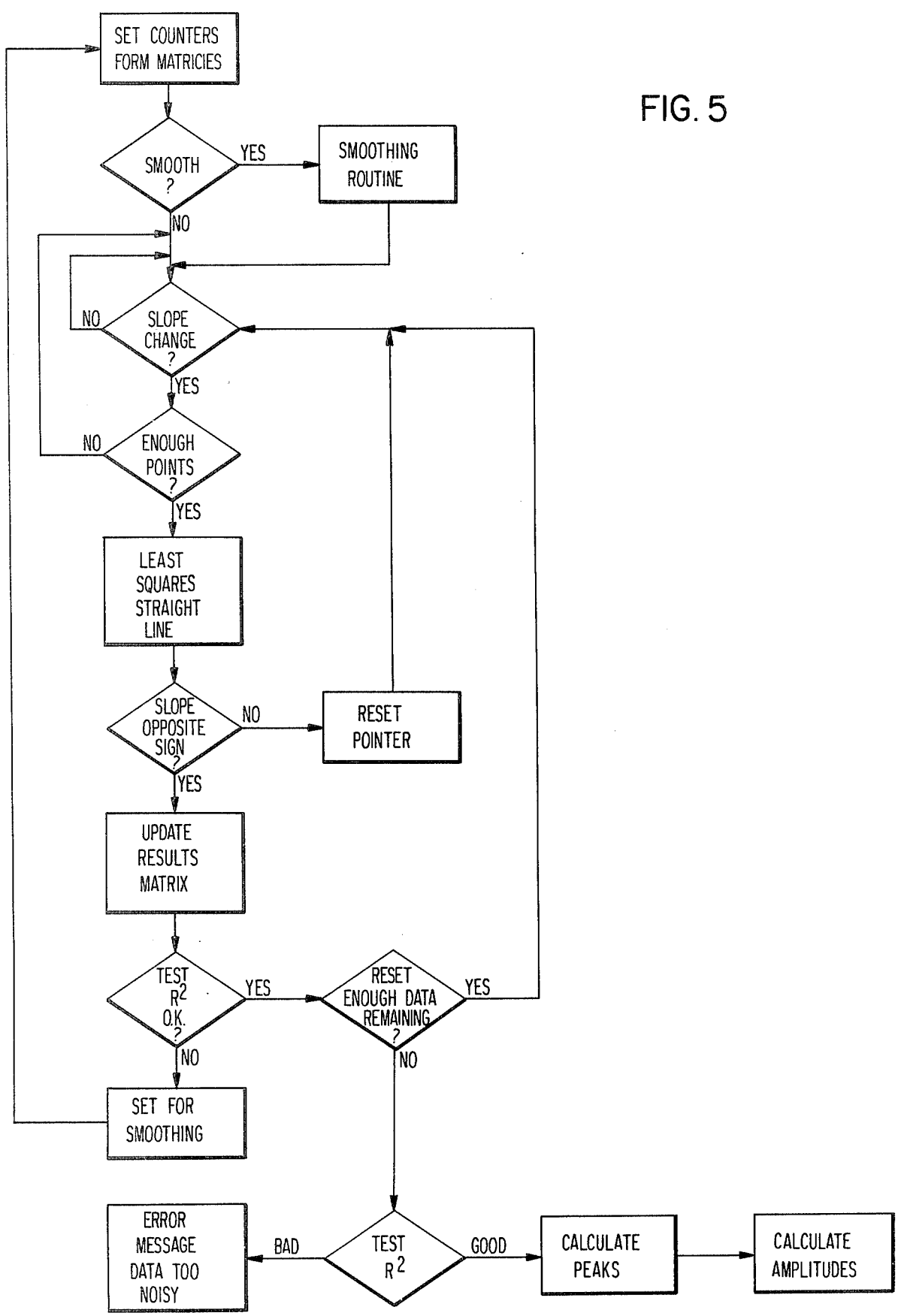
FIG. 5 is a flow diagram illustrating the program employed by the programmed general computer which is a part of the apparatus according to the invention shown in FIG. 4.

FIG. 5 shows the flow diagram for the program for the programmed digital computer 28. The program is based on APL (A Programming Language) and may, for example, employ the APL package available from International Business Machine Corporation (IBM) and identified as APL Statistical Library for APL SB and APL CMS (5796-PGQ) and for VS APL (5796-PHW). This statistical library includes all of the subroutines required in the program illustrated in flow diagram form in FIG. 5.

Now, with particular reference to FIG. 5, at the beginning of the program, the computer counters and memory matrices are initialized to begin receiving the digitized data from the analog-to-digital converter 27. The first question asked in the flow diagram is whether the input waveform is sufficiently smooth to perform the recovery operation according to the invention. Assuming for the moment that no smoothing routine is required, the next question is whether a slope change has been detected. In other words, each sampled point is compared with the preceding points to detect when a change in sign of the slope of the waveform occurs. The detection of such change in sign of slope is the end of the sequence of the points which defines a section of the waveform that either monotonically increases or decreases. When the end of the sequence has been detected, the number of points in the sequence is tested to determine if enough points have been accumulated for a least squares straight line fit. For example, thirteen (13) points can be arbitrarily chosen as the criterion as to whether enough points have been accumulated. If fewer than thirteen (13) points have been accumulated, then the program returns to the accumulation and testing of points of the next sequence. If, however a sufficient number of points, thirteen (13) or greater in our example, has been accumulated, then these points are used in a least squares straight line fitting subroutine. The output of the subroutine is data defining the slope and Y intercept of the least squares straight line fit.

The next step in the program is to test the slope of this line with the slope of the just-preceding computed line. If the slopes are opposite in sign, then we know that the two lines are intersecting and between different peaks of the input signal waveform. However, if the slopes are of the same sign, then it is assumed that the two lines are really a continuum between the same two peaks of the input waveform. In this event, the program returns to testing and accumulating points in the sampled sequence. Assuming that the slope of the line just computed is opposite to that of the preceding line computed, then the slope and Y intercept of this line is stored in the memory matrix.

At this point in time, either one of two things can be done. Either the data defining each of the computed lines—i.e., slopes and Y intercepts—can be accumulated in memory and, subsequently, this data read out to solve the series of simultaneous linear equations which will define the times of occurrence of the peaks in the input signal waveform, or the simultaneous linear equations can be solved as each straight line fit is computed. The latter approach, of course, permits real time or on-the-fly operation. However, in the program illustrated by the flow diagram in FIG. 5, the solutions of the series of simultaneous linear equations takes place after all of the input data have been evaluated.

The program illustrated by the flow diagram in FIG. 5 includes two refinements which are useful in cases of extremely high noise levels. Returning to the first question in the flow diagram, the input voltage waveform is first tested to determine if it is sufficiently smooth for the signal recovery technique according to the invention. This can be done by testing the sign reversals of the changes in the sampled voltage levels of the input waveform. If a predetermined number of sign reversals occur within a given time period, then the input data will go through a binomial smoothing subroutine. A second test for smoothness is made at the end of the line calculations. More specifically, the line computed by the least squares straight line fit is tested by application of a correlation coefficient to the slope of the calculated line. This is done by comparison to the actual sampled data in the same range. If the correlation coefficient falls below some predetermined value, such as 0.9, then the program is set for the binomial smoothing subroutine. In this way, extra peaks in very noisy signals are eliminated.

It will be understood by those skilled in the art, however, that some of the operations performed digitally can, in a given application, be performed by analog methods. For example, the binomial smoothing subroutine employed in the flow diagram of the program illustrated in FIG. 5 can be replaced by an analog filter. For example, if it is determined that the input data to the programmed digital computer requires smoothing, then a control signal can be generated by the digital computer 28 to control the input switch 24. The switch 24 then supplies the input noisy signal to a low-pass filter 29 before supplying the signal to the sample-and-hold circuit 25.

Figure 6:
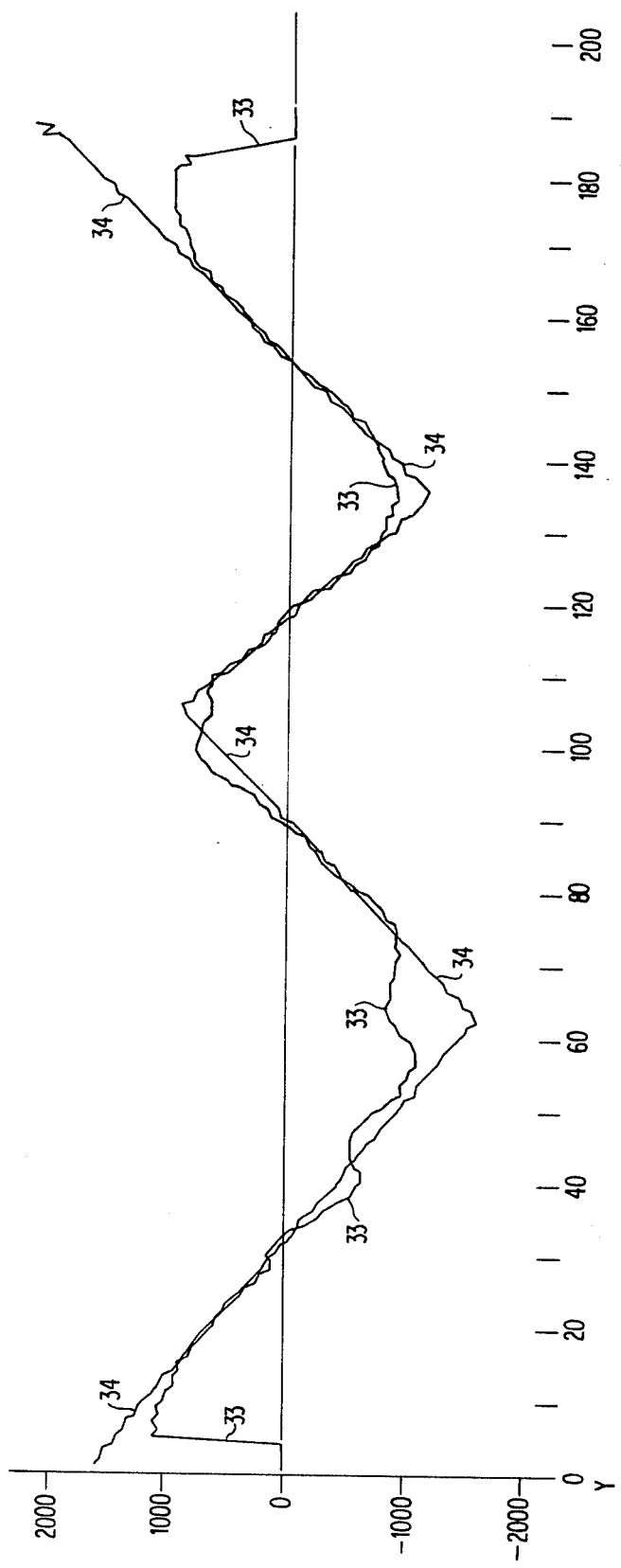
FIG. 6 is a representation of an actual computer printout showing a noisy input signal waveform and a computed triangular waveform having peaks corresponding to the peaks in the input noisy signal.

Returning now to the flow diagram of the program illustrated in FIG. 5, at such time as all of the input data have been used to calculate the series of straight line approximations, then the slope and Y intercept data are read out of memory to calculate both the time of occurrence and the amplitude—i.e., the coordinates of the intersections of the series of straight lines. Before this is done, however, one final test may be made on the computed data to determine if the data is good or not. This test is again a correlation coefficient test, and if a sufficient value of correlation is not achieved, then an error message is generated to indicate that the input data is too noisy and the signal cannot be recovered. On the other hand, if the correlation coefficient is sufficiently high, then the times of occurrence and amplitudes of the peaks of the triangular wave represented by the intersecting straight lines are computed. FIG. 6 illustrates in graphical form the results of this calculation. In FIG. 6, the noisy input signal 33 is approximated by a triangular waveform signal 34 composed of a series of intersecting straight lines. As previously mentioned, the amplitudes of the peaks of the triangular waveform can be divided by a factor of 1.507 to derive a measure of the amplitudes of the peaks of the input waveform.

Referring again to FIG. 4, the computed output data from the programmed digital computer 28 can be supplied to a digital-to-analog converter 30 to generate an output analog signal. The nature of this analog signal will depend on the data supplied by the programmed digital computer 28. For example, if the computer 28 calculates the amplitudes of the input waveform, the output of the digital-to-analog converter 30 would be the recovered signal. On the other hand, it would be possible for the computer 28 to supply data which define the triangular waveform formed by the series of intersecting straight lines. In this case, the analog signal waveform of the digital-to-analog converter 30 would be a triangular waveform signal, and this signal could be supplied to the low-pass filter 31, which would provide a generally sinusoidal output as the recovered signal.

The following is a computer printout of the computer program represented by the flow diagram shown in FIG. 5.

```
        ∇ R←LA PEAK RA;A;B;I;J;K;L;X;RR;ANS;COEF
[1]     GO:K←1+⌊LA÷2  Δ  D←X←0ρ,R←  1  4  ρI←L←0
[2]     ⍝✦✦✦SET COUNTERS, MATRICES, ETC.✦✦✦
[3]     →(((2<A←LA),1)/S0,S1),C←B←RA
[4]     ⍝✦✦✦TEST FOR SMOOTHING✦✦✦
[5]     S0:A←A÷+/A←(⁻1+⍳A)!A-1  Δ  C←(LA÷2)ρ0
[6]     LP0:→LP0×⍳(ρA)≤ρB←1+B  Δ  C←C,+/A×(ρA)↑B
[7]     C←C,(⌊(A+ρA)÷2)ρ0
[8]     ⍝✦✦✦SMOOTHING✦✦✦
[9]     S1:→LP2×⍳C[K+1+I]>C[K+I]
[10]    ⍝✦✦✦TEST FOR SLOPES✦✦✦
[11]    LP1:→((((K+I+6)≥ρC)∨C[K+I+1]>C[K+I←I+1]),1)/CAL,LP1
[12]    LP2:→((((K+I+6)≥ρC)∨C[K+I+1]<C[K+I←I+1]),1)/CAL,LP2
[13]    ⍝✦✦✦CONTINUE TILL SLOPE CHANGE✦✦✦
[14]    CAL:→S1×⍳~((K+I+6)≥ρC)∨(I>10)
[15]    ⍝✦✦✦TEST FOR NUMBER OF POINTS✦✦✦
[16]    J←(K+⌈I÷2)-  6 5 4 3 2 1 0 ⁻1 ⁻2 ⁻3 ⁻4 ⁻5 ⁻6
[17]    ANS←2 STREG⍭ 2 13 ρJ,C[J]
[18]    ⍝✦✦✦REGRESSION✦✦✦
[19]    →S3×⍳(1≥1+ρR)∨((R[1+ρR;2]>0)∧ANS[2;2]<0)∨(R[1+ρR;2]<0)∧ANS[2;2]>0
[20]    ⍝✦✦✦TEST SLOPES✦✦✦
[21]    →CAL,(,R←  ⁻1 0 ↓R),(K←R[⁻1+1+ρR;4]),I←I+K-R[⁻1+1+ρR;4]
[22]    ⍝✦✦✦RESET POINTERS SLOPE SAME✦✦✦
[23]    S3:R←R,[1] ANS[1 2 ;2],ANS[5;5],K←I+K
[24]    ⍝✦✦✦UPDATE MATRIX WITH α,BETA,RSQ AND K✦✦✦
[25]    →S2×⍳1≤+/((0.8×A>10)+0.9×A≤10)>(⁻1 0 ↓ 2 0 ↑R)[;3]
[26]    ⍝✦✦✦TEST FOR RSQ ≤.8 MORE THAN THREE TIMES✦✦✦
```

```
[27]    →S1×ι(ρC)>K+7 ∆ I←0
[28]    ⍝↑↑↑RESET I AND TEST FOR DATA REMAINING↑↑↑
[29]    →ERR×ι0=1↑ρRR←R←(R[;3]≥(0.8×A>10)+0.9×A≤10)/[1] R← 1 0 ↓R
[30] LP3:→LP3×ι2≤1↑ρRR← 1 0 ↓RR ∆ X←X,-(-/RR[ι2;1])÷-/RR[ι2;2]
[31]    I←⌈(R←R,0,X)[1;3]
[32] LP4:D←D,R[I;1]+R[I;2]×(⌊R[I;5])+ι⌊R[I+1;5]
[33]    →LP4×ι(I←I+1)<1↑ρR
[34]    D←D,R[I;1]+R[I;2]×(⌊R[I;5])+ιρB
[35]    ⍝↑↑↑D IS VECTOR FOR PLOTTING TANGENTS↑↑↑
[36]    'A IS ';A
[37]    ⍝↑↑↑CALCULATE PEAKS↑↑↑
[38]    R←R,0,B[⌊1+R[;5]]⌈B[⌈1+R[;5]]
[39]    ⍝↑↑↑AMPLITUDES↑↑↑
[40]    →0
[41] ERR:→0 ∆ ⎕←'DATA TOO NOISY'
[42] S2:→GO,LA←LA+~2|LA←LA+2
[43]    ⍝↑↑↑INCREASE SMOOTHING BY 2↑↑↑
        ∇

∇ ANS←V STREG X;R;S;M;I;J;K;A;B;P;N;T
[1]     RR← 1 1 ⌽⌽CM 0 ¯1 ↓X
[2]     R←X÷(V∘.×V←(1 1)⍴X←(⍉X)+.×X←X-(ρX)ρM←(+/[1] X)÷N←(ρX)[1])*
        0.5
[3]     S←ρ'' ρV←ιρV
[4]     T←V REG X
[5] L1:S←S,M,V[K←(⌊|.R[I;J])⌊M←⌈/|.R[I←ι(J-1);J←ρV]]
[6]     →(¯1↑(V←K/I),1<''ρ(ρR←((K/[1] K/R)-A∘.×A)÷(B∘.×B←1-(A←(K←K≠ιJ)/R
        [;K])*2)*0.5)[1])/L1
[7]     P←(0=2|ιρS)/S
[8]     R←((1=2|ιρS)/S)*2
[9]     S←(ι0),0
[10] L2:S←S,R[ρS]×1-+/S
[11]    →((ρS)≤ρR)/L2
[12]    T[ιρS;5]←(V-1)⌽S[⍋S[1,1+P]]
[13]    ANS←(T,0,((1-T[¯1+1↑ρT;2] TDIST|T[1+ι(1↑ρT)-4;4])÷2),3ρ0),0,RR,
        3ρ0
        ∇

∇ R←CM X;V
[1]     R←R÷(V∘.×V←(1 1)⍴R←(⍉R)+.×R←X-(ρX)ρ(+/[1] X)÷(ρX)[1])*
        0.5
        ∇

∇ T←V REG X;R;S;B
[1]     T←((3+ρV),5)ρ0
[2]     T[ιρV;1]←¯1↓V
[3]     T[3+ρV;3]←X[ρV;ρV]
[4]     X← ¯1 0 ↓X
[5]     B←(-M+.×B,¯1),B←,(S←⌹ 0 ¯1 ↓X)+.×X[;ρV]
[6]     T[ιρV;2]←B
[7]     T[1+ρV;3]←(1↓B)+.×X[;ρV]
[8]     T[(ρV)+ι3;2]←((ρV)-1),(N-ρV),N-1
[9]     T[2+ρV;3]←-/T[(3+ρV),1+ρV;3]
[10]    T[(ρV)+ι2;4]←T[(ρV)+ι2;3]÷T[(ρV)+ι2;2]
[11]    T[1+ι(ρV)-1;3]←(T[2+ρV;4]×+/S×(ι(ρV)-1)∘.=ι(ρV)-1)*
        0.5
[12]    T[1+ι(ρV)-1;4]←T[1+ι(ρV)-1;2]÷T[1+ι(ρV)-1;3]
[13]    T[3+ρV;4]←T[2+ρV;4]*0.5
[14]    T[1+ρV;5]←T[1+ρV;4]÷T[2+ρV;4]
[15]    T[3+ρV;5]←T[1+ρV;3]÷T[3+ρV;3]
[16]    COEF←¯3↑T[;2]
        ∇

∇ R←LA TDIST RA;TTA
[1]     ⍝  THIS PRGM IS BASED ON THE PAPER 'ON APPROXIMATIONS
[2]     ⍝  TO THE T-DISTRIBUTION', E.J.DUDEWICZ AND S.R.DALAL,
[3]     ⍝  JQT,4,4(OCT. '72),PP196-198. APL BY R.R.STONE.
[4]     ⍝  LA IS THE DEGREES OF FREEDOM AND RA IS A CALCULATED
[5]     ⍝  T VALUE. THE OUTPUT IS THE ONE-TAILED PROBABILITY.
[6]     →S0×ιLA>''ρ1,R←0×TTA←¯3○RA÷LA*0.5
```

```
[7]    →0,R←0.5+TTA÷○1
[8]    S0:→S1×ι~2|LA
[9]    →S2×ιLA<5
[10]   R←((×\(~2|ιLA-3)/ιLA-3)÷×\1↓(2|ιLA-2)/ιLA-2)+.×⌽(2○TTA)∘.*1↓(
       2|ιLA-2)/ιLA-2
[11]   S2:→0,R←0.5+(÷○1)×TTA+(1○TTA)×(2○TTA)+R
[12]   S1:→S3×ιLA<4
[13]   R←((×\(2|ιLA-3)/ιLA-3)÷×\(~2|ιLA-2)/ιLA-2)+.×⌽(2○TTA)∘.*(~
       2|ιLA-2)/ιLA-2
[14]   S3:→0,R←0.5+(0.5×1○TTA)×1+R
∇
```

What is claimed is:

1. A signal recovery apparatus comprising:
   input means for receiving a noisy input signal having a generally sinusoidal waveform but with peaks substantially obliterated by a high level of noise and representative of a desired input signal with clearly identifiable signal peaks;
   means for repeatedly measuring successively adjacent slopes of the most linear portions having at least a given minimal linear extent of the noisy input signal between two successive like polarity signal peaks;
   determining means receiving said measurement indications for repeatedly determining points of intersection of said most linear portions extrapolated using said measured slopes to identify signal peaks of unlike polarity to and between said two successive like polarity signal peaks; and
   means responsive to said determining means for generating the desired input signal using said determined points of intersection.

2. A signal recovery apparatus as recited in claim 1 wherein said measuring means comprises analog to digital converter means for converting said input signal to a timed sequence of digital signals and said determining means includes a programmed digital computer which processes said timed sequence of digital signals in accordance with the following program steps:
   measuring the voltage changes of said input signal at predetermined constant time increments until a change in sign of the voltage changes is detected;
   determining if a predetermined number of voltage changes have been measured since the last detected change in sign, and if so;
   calculating a set of digital signals representing a straight line which approximately fits points along the measured waveform of said input signal corresponding to the most recent of said measured voltage changes, said set of digital signals indicating a slope and Y intercept of the represented straight line and including a sign indication of said slope for signifying a direction of said slope; and
   comparing the sign indication of the slope of the most recently generated straight line with the sign indication of the next preceding generated straight line, and if said sign indications are different;
   calculating the point of intersection of the two straight lines at the time of occurrence of a peak of the desired input signal.

3. A signal recovery apparatus as recited in claim 2 wherein said program steps further include storing said sets of digital signals after each step of comparing, and performing said step of calculating only after all of said voltage changes have been measured.

4. A signal recovery apparatus as recited in claim 1 further comprising means for smoothing said input signal before said input signal is supplied to said means for measuring.

5. A signal recovery apparatus as recited in claim 4 wherein said means for smoothing is part of said input means.

6. A signal recovery apparatus as recited in claim 2 wherein said means for generating the desired input signal includes a digital-to-analog converter connected to receive output digital data from a programmed digital computer.

7. A signal recovery apparatus as recited in claim 6 wherein said means for generating the desired input signal further includes a low-pass filter for integrating the output of said digital-to-analog converter.

8. The method of detecting a signal peak of an input signal representative of a desired signal but having a succession of substantially obliterated signal peaks of alternating polarity and false signal peaks intermediate said obliterated signal peaks,
   including the steps of:
   generating a timing signal defining a succession of time intervals having a duration which is a minor portion of elapsed time between two successive ones of said obliterated signal peaks,
   at the end of each one of said time intervals measuring signal amplitude of said input signal for indicating a point of said input signal,
   converting each said measured signal amplitude to a corresponding signal point set of digital signals representative of said measured signal amplitude and polarity by sign;
   storing a succession of said point sets of digital signals;
   comparing a succession of a given number of said point sets of digital signals to detect a change in slope direction preceded by a linear portion having a given minimal linear extent to indicate a given minimal linear slope portion;
   calculating a numerical set of digital signals from said succession of point sets of signals indicating direction and angle of slope and direction of slope and Y-intercept for said detected given minimal linear slope portion,
   repeating said measuring, converting, storing and comparing steps until a next successive minimal linear slope portion of opposing sign to said given minimal linear slope portion is detected, then repeating said calculating step for said next successive minimal linear slope portion,
   combining said point sets of digital signals for said given and said next minimal linear slope portions to indicate a time of occurrence of an intercept point of said slope portions; and
   creating an output signal having a characteristic representative of a signal peak in said input signal that occurs in time at said intercept point and polarity in accordance with the sign of said given and next minimal linear slope portions.

9. The method set forth in claim 8 further including repeating all recited steps therein for replicating said desired signal in said output signal.

10. The method of extracting an information bearing electrical signal from an input electrical signal having substantial distortion including obliterated signal peaks, said information bearing signal having a succession of signal peaks of alternating polarity, including the steps of:

measuring and indicating signal amplitude and signal polarity of said input signal at a succession of closely timed points, storing said indications, successively comparing two successive signal amplitudes for detecting a change in signal slope, then measuring the linearity between a predetermined number of immediately preceding signal amplitude comparisons, for each step yielding a change in signal slope preceded by a linear set of said successive signal amplitude comparisons, generating an indication of a peak-indicating slope including direction of slope (angle) for said information bearing signal, repeatedly combining two immediately-successive oppositely-angled peak-indicating slope indications to indicate a succession of slope intercepts, and generating an electrical output signal having characteristics representing successive peaks of alternating polarity in said information bearing signal.

11. The method set forth in claim 10 wherein said indications are capable of yielding a least squares straight line fit and said comparing step includes a least squares calculation for measuring linearity.

12. Apparatus for extracting an information bearing electrical signal from a distorted input electrical signal; said signals including a succession of signal peaks of alternating polarity, the combination of:

a clock for supplying a succession of closely timed clock signals;

signal receiving means for receiving said input signal and being timed by said clock signals to supply a timed succession of point sets of digital signals respectively indicative of polarity and amplitude of said received input signal occurring at each of said clock signals;

a programmed digital computer connected to said signal receiving means for receiving and storing said timed succession of point sets of digital signals, said programmed digital computer storing a program of computer instructions enabling said programmed digital computer to:

successively compare two successive ones of said point sets of digital signals for detecting a change in signal slope of said input signal, then measure the linearity between a predetermined number of immediately preceding received point sets of digital signals, for each compare yielding a change preceded by a linear set of indications having at least a given number of indications, generate an indicating set of digital signals representing a peak-indicating slope of said input signal, and then to successively combine two successive ones of said indicating sets of digital signals for effectively comparing two immediately adjacent successive oppositely angled peak indicating slopes to generate a succession of timed slope intercept sets of digital signals which include an indication of polarity of slope intercept; and output signal means connected to said programmed digital computer for receiving said succession of timed slope intercept sets of digital signals to generate said information bearing signal having a succession of signal peaks with alternating polarity.

* * * * *